(12) United States Patent
Xiao

(10) Patent No.: US 12,743,160 B1
(45) Date of Patent: Sep. 22, 2026

(54) METHOD AND SYSTEM FOR DETERMINING INPUT AXIS, AND COMPUTER READABLE STORAGE MEDIUM

(71) Applicant: HTC Corporation, Taoyuan City (TW)

(72) Inventor: Fu-Ren Xiao, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 0 days.

(21) Appl. No.: 19/086,087

(22) Filed: Mar. 20, 2025

(51) Int. Cl.
*G06F 3/0346* (2013.01)
*G06F 3/01* (2006.01)
*G06F 3/0485* (2022.01)

(52) U.S. Cl.
CPC ............ *G06F 3/0346* (2013.01); *G06F 3/014* (2013.01); *G06F 3/0485* (2013.01)

(58) Field of Classification Search
CPC ....... G06F 3/0346; G06F 3/014; G06F 3/0485
See application file for complete search history.

(56) References Cited

U.S. PATENT DOCUMENTS

2011/0291929 A1* 12/2011 Yamada ................ G06F 3/0346 345/158
2014/0204024 A1 7/2014 Kim et al.
2016/0077587 A1* 3/2016 Kienzle ................... G06F 3/033 345/156
2023/0081527 A1* 3/2023 Kimishima .......... G01C 25/005 345/179
2023/0280840 A1* 9/2023 Chang ..................... G06T 7/246 345/156
2024/0288938 A1* 8/2024 Dahlgren ................ G06F 3/017
2025/0085743 A1* 3/2025 Lee ......................... G06F 3/011
2025/0377724 A1* 12/2025 Kashu ..................... G06F 3/014

FOREIGN PATENT DOCUMENTS

CN 117616366 2/2024
TW 201642943 12/2016
TW 202437069 9/2024

OTHER PUBLICATIONS

"Office Action of Taiwan Counterpart Application", issued on Apr. 28, 2026, p. 1-p. 12.

* cited by examiner

*Primary Examiner* — Liliana Cerullo
(74) *Attorney, Agent, or Firm* — JCIPRNET

(57) ABSTRACT

The embodiments of the disclosure provide a method and system for determining an input axis, and a computer readable storage medium. The method includes: determining, by a peripheral device or a host, a first reference direction of the host, wherein the peripheral device has an input device, the peripheral device is connected with the host, and the host has a display; determining, by the peripheral device or the host, a first input axis associated with the input device on the peripheral device based on the first reference direction; in response to determining that a first input operation is detected by the input device, transforming, by the peripheral device or the host, the first input operation into a first input event relative to the first input axis; and controlling, by the peripheral device or the host, visual content displayed by the display of the host based on the first input event.

18 Claims, 6 Drawing Sheets

METHOD AND SYSTEM FOR DETERMINING INPUT AXIS, AND COMPUTER READABLE STORAGE MEDIUM

BACKGROUND OF THE INVENTION

1. Field of the Invention

The disclosure generally relates to a mechanism for determining an input mechanism, in particular, to a method and system for determining an input axis, and a computer readable storage medium.

2. Description of Related Art

Wearable smart devices often have predefined structural constraints that may limit the flexibility of how they are worn. This issue is particularly evident in ring-type accessories, which can be challenging to maintain in a fixed orientation or position during natural use. As a result, such devices may unintentionally shift from their intended alignment, leading to deviations in operation and input accuracy.

Therefore, from the perspective of those skilled in the art, a technical solution that can dynamically adapt to the user's real-time wearing position or habitual orientation would be highly beneficial.

SUMMARY OF THE INVENTION

Accordingly, the present disclosure is directed to a method and system for determining an input axis, and a computer readable storage medium, which can be used to solve the above technical problem.

The embodiments of the disclosure provide a method for determining an input axis. The method includes: determining, by a peripheral device or a host, a first reference direction of the host, wherein the peripheral device has an input device, the peripheral device is connected with the host, and the host has a display; determining, by the peripheral device or the host, a first input axis associated with the input device on the peripheral device based on the first reference direction; in response to determining that a first input operation is detected by the input device, transforming, by the peripheral device or the host, the first input operation into a first input event relative to the first input axis; and controlling, by the peripheral device or the host, visual content displayed by the display of the host based on the first input event.

The embodiments of the disclosure provide a system for determining an input axis, including a host and a peripheral device. The host has a display. The peripheral device is connected to the host. The peripheral device or the host determines a first reference direction of the host, wherein the peripheral device has an input device, the peripheral device is connected with the host, and the host has a display. The peripheral device or the host determines a first input axis associated with the input device on the peripheral device based on the first reference direction. In response to determining that a first input operation is detected by the input device, the peripheral device or the host transforms the first input operation into a first input event relative to the first input axis. The peripheral device or the host controls visual content displayed by the display of the host based on the first input event.

The embodiments of the disclosure provide a computer readable storage medium, the computer readable storage medium recording an executable computer program, the executable computer program being loaded by a peripheral device or a host to perform steps of: determining a first reference direction of the host, wherein the peripheral device has an input device, the peripheral device is connected with the host, and the host has a display; determining a first input axis associated with the input device on the peripheral device based on the first reference direction; in response to determining that a first input operation is detected by the input device, transforming the first input operation into a first input event relative to the first input axis; and controlling visual content displayed by the display of the host based on the first input event.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
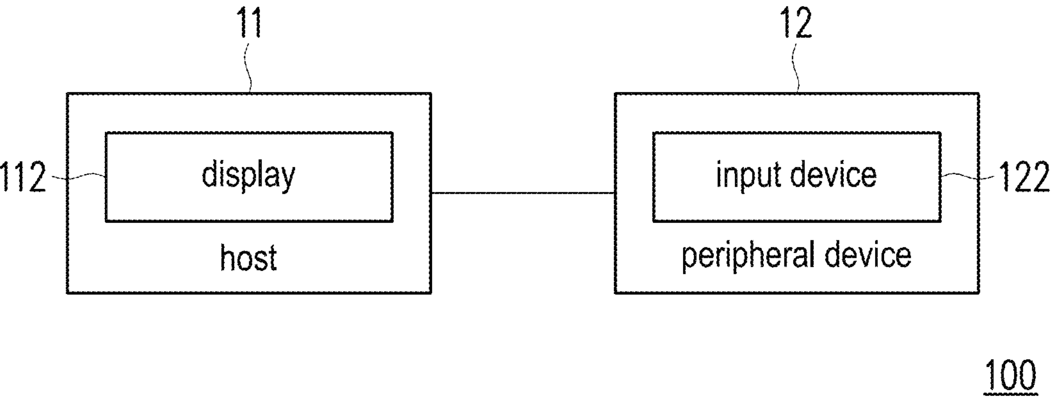
FIG. 1 shows a schematic diagram of a system according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

See FIG. 1, which shows a schematic diagram of a system according to an embodiment of the disclosure. In various embodiments, the system 100 at least includes a host 11 and a peripheral device 12.

In some embodiments, the host 11 can be any smart device and/or computer device that can provide visual contents of reality services such as virtual reality (VR) service, augmented reality (AR) services, mixed reality (MR) services, and/or extended reality (XR) services, but the disclosure is not limited thereto. In some embodiments, the host 11 can be a head-mounted display (HMD) capable of showing/providing visual contents (e.g., AR/VR/MR contents) for the wearer/user to see.

In one embodiment, the host 11 can be disposed with a (built-in) display 112 for showing the visual contents for the user to see. Additionally or alternatively, the host 11 may be connected with one or more external displays, and the host 11 may transmit the visual contents to the external display(s) for the external display(s) to display the visual contents, but the disclosure is not limited thereto.

In some embodiments, the host may include a storage circuit and a processor. The storage circuit is one or a combination of a stationary or mobile random access memory (RAM), read-only memory (ROM), flash memory, hard disk, or any other similar device, and which records a plurality of modules that can be executed by the processor.

The processor may be coupled with the storage circuit, and the processor may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, a graphic processing unit (GPU), and the like.

In some embodiments, the peripheral device 12 may refer to, for example, external hardware components that enhance the functionality, interaction, and immersion of the XR experience. The peripheral device 12 may include handheld controllers, which allow users to interact with virtual objects through hand tracking or button inputs; haptic gloves or suits, which provide tactile feedback for a more immersive experience. In other embodiments, the peripheral device 12 may include various wearable devices, such as a smart ring, a smartwatch, a fitness band, a smart insole, a haptic shoe, a gesture-control armband, and/or a smart clothing, but the disclosure is not limited thereto.

In the embodiment, the host 11 may be connected with the peripheral device 12 in various ways, including wired connections like HDMI, USB, or DisplayPort for video signals, data transfer, and power. Wireless connections using Bluetooth or Wi-Fi provide freedom of movement by linking peripherals such as controllers, haptic gloves, or headphones without cables. Dedicated RF links are used for low-latency communication with external tracking systems or motion capture devices. Some peripherals also connect via USB or proprietary ports for data and power, while infrared (IR) or optical sensors enable precise movement tracking between the HMD and peripherals. Additionally, Near Field Communication (NFC) can facilitate proximity-based interactions between devices like smart rings and the HMD.

In FIG. 1, the peripheral device 12 includes an input device 122, which allows the user to perform input operations. In various embodiments, the input device 122 may include at least one of buttons and joysticks, touchpads and touchscreens, haptic and pressure sensors, gesture recognition sensors, voice input microphones, and biometric sensors, but the disclosure is not limited thereto.

In one embodiment, the input device 122 may be an optical finger navigation device. An Optical Finger Navigation (OFN) circuit is a system that detects finger movement using an optical sensor, similar to an optical mouse. It consists of an optical sensor (CMOS or CCD) that captures images of the finger surface, an LED or infrared light source for illumination, an image processing unit (MCU/ASIC) that analyzes texture patterns and calculates motion vectors, a communication interface ($I^2C$, SPI, or USB) to transmit data, and a power management unit for efficient energy use. The system works by continuously capturing images, comparing sequential frames to detect displacement, and calculating movement direction and speed. This data is then sent to the main system to control cursor movement or scrolling, but the disclosure is not limited thereto.

In the embodiments of the disclosure, the system 100 may be used to carry out the proposed method for determining an input axis, which would be introduced below.

Figure 2:
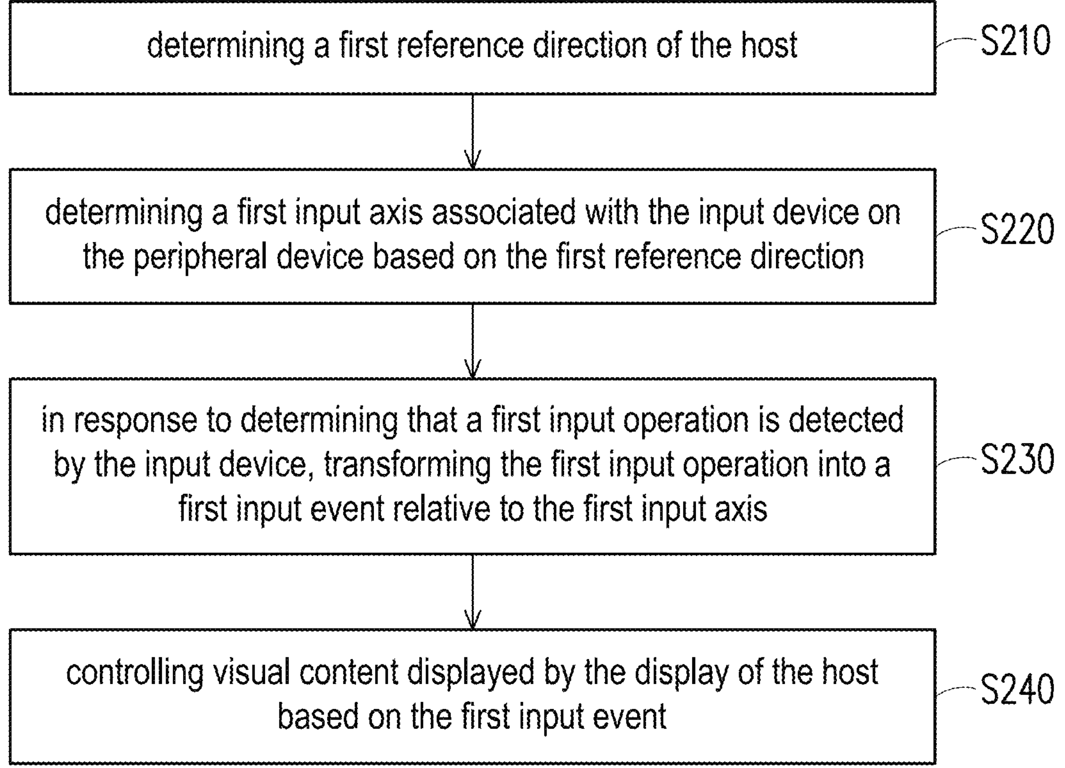
FIG. 2 shows a flow chart of the method for determining an input axis according to an embodiment of the disclosure.

See FIG. 2, which shows a flow chart of the method for determining an input axis according to an embodiment of the disclosure. The method of this embodiment may be executed by the host 11 or the peripheral device 12 in FIG. 1, and the details of each step in FIG. 2 will be described below with the components shown in FIG. 1.

In step S210, the peripheral device 12 or the host 11 determines a first reference direction of the host 11.

In one embodiment, the first reference direction is a front direction where the host 11 faces.

In different embodiments, the front direction where the host 11 faces may be determined by using various sensor-based tracking technologies, such as inertial measurement unit (IMU) sensors, including gyroscopes, accelerometers, and magnetometers, detect rotational movement, tilt, and absolute direction; inside-out tracking relies on built-in cameras and depth sensors to analyse the environment; outside-in tracking uses external systems, such as lighthouse base stations or optical motion capture cameras, to track the HMD's position and orientation; simultaneous localization and mapping (SLAM) algorithms to map the environment and enhance tracking accuracy, but the disclosure is not limited thereto.

In other embodiments, the first reference direction can be other directions (e.g., leftward, rightward, or backward) determined based on the pose (e.g., position and rotation) of the host 11.

For better understanding, the front direction where the host 11 faces would be used as an example of the first reference direction, but the disclosure is not limited thereto.

In step S220, the peripheral device 12 or the host 11 determines a first input axis associated with the input device on the peripheral device 12 based on the first reference direction.

In the embodiments of the disclosure, the term "input axis" may refer to a directional control parameter that measures movement along a specific coordinate axis, commonly used in joysticks, motion controllers, gamepads, and VR tracking systems. A 2D input axis includes the X-axis (left-right movement) and Y-axis (up-down movement) for navigation or camera control, while a 3D input axis adds the Z-axis (forward-backward movement) for depth-based interactions. Additionally, rotational axes such as pitch (tilting up/down), yaw (turning left/right), and roll (tilting sideways) enable full rotational movement in XR environments.

In the embodiments where the input device is assumed to be an OFN circuit, the first input axis may be one of the X-axis (also known as a horizontal input axis) and Y-axis (also known as a vertical input axis), but the disclosure is not limited thereto.

Figure 3:
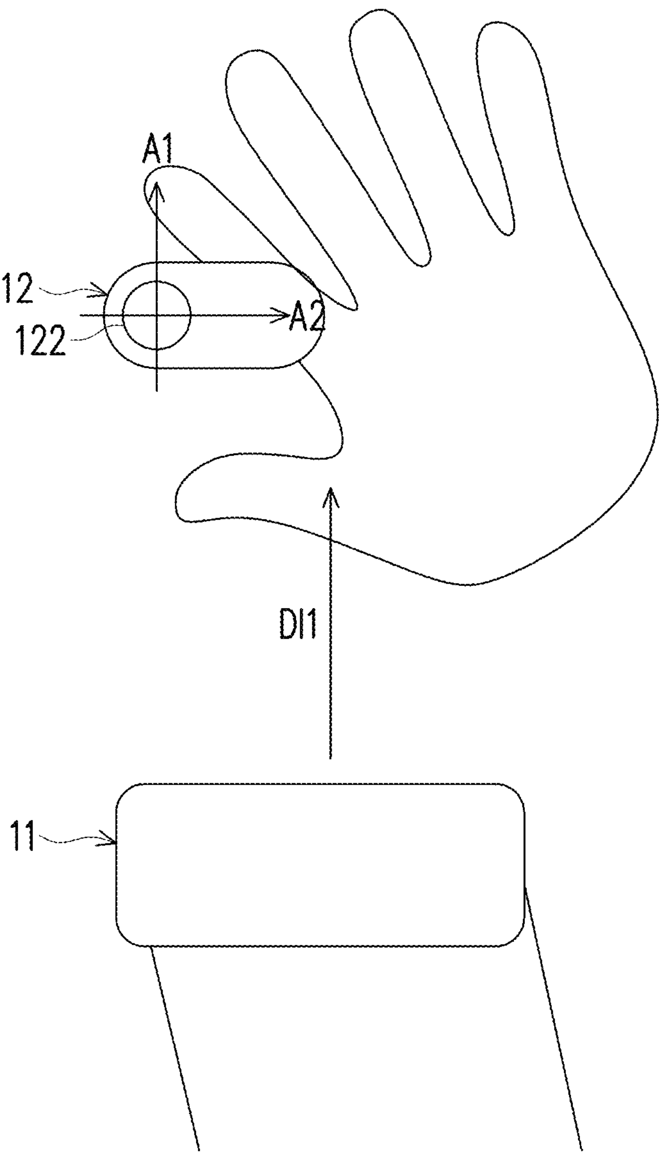
FIG. 3 shows a schematic diagram of determining the first input axis associated with the input device based on the first reference direction according to a first embodiment of the disclosure.

See FIG. 3, which shows a schematic diagram of determining the first input axis associated with the input device based on the first reference direction according to a first embodiment of the disclosure.

In FIG. 3, the host 11 is assumed to be an HMD, and the first reference direction DI1 is assumed to be the front direction where the host 11 faces, which can also be understood as the direction where the front camera of the HMD faces. In addition, the peripheral device 12 connected with the host 11 is assumed to be a smart ring worn on the hand of the user, and the input device 122 on the peripheral device 12 is assumed to be an OFN circuit.

In the embodiment, the peripheral device 12 or the host 11 may determine the first reference direction DI1 as the positive direction of the first input axis A1.

In FIG. 3, the first input axis A1 may be assumed to be the vertical input axis for better understanding. In this case, the positive direction of the first input axis A1 may be understood as the +Y direction of the coordinate system used by the input device 122, but the disclosure is not limited thereto.

In one embodiment, once the first input axis A1 has been determined, the peripheral device 12 or the host 11 may determine a second input axis A2 associated with the input device 12 based on the first input axis A1.

In the embodiments where the first input axis A1 is the vertical input axis, the second input axis A2 may be a horizontal input axis associated with the input device 12.

In the scenario of FIG. 3, once the first input axis A1 is determined, the peripheral device 12 or the host 11 may accordingly determine the second input axis A2.

For example, the OFN circuit may be assumed to be receiving/detecting the input operation from the user by using a sensing plane, the peripheral device 12 or the host 11 may determine the first input axis A1 on the sensing plane and rotate (the positive direction of) the first input axis A1 by, for example, 90 degrees to determine (the positive direction of) the second input axis A2, but the disclosure is not limited thereto.

Figure 4A:
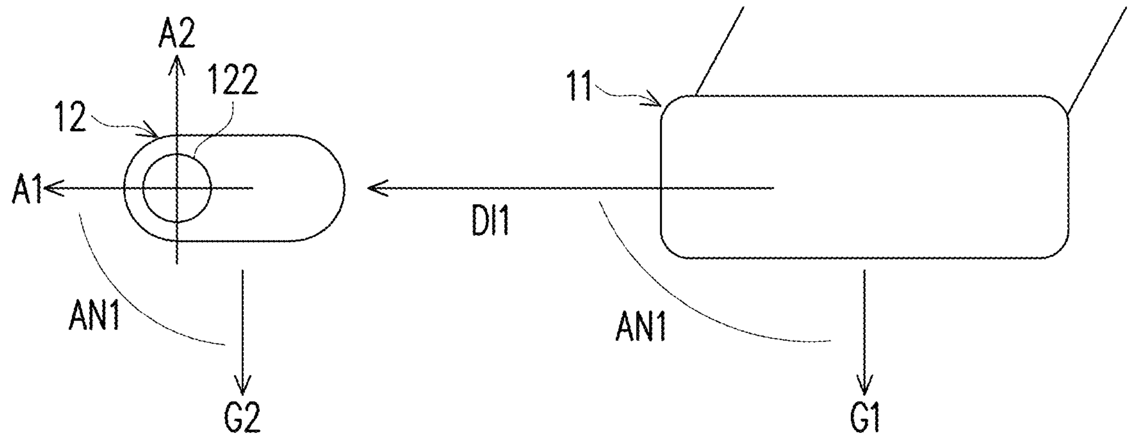
FIG. 4A and FIG. 4B show further schematic diagrams of determining the first input axis associated with the input device based on the first reference direction according to FIG. 3.
Figure 4B:
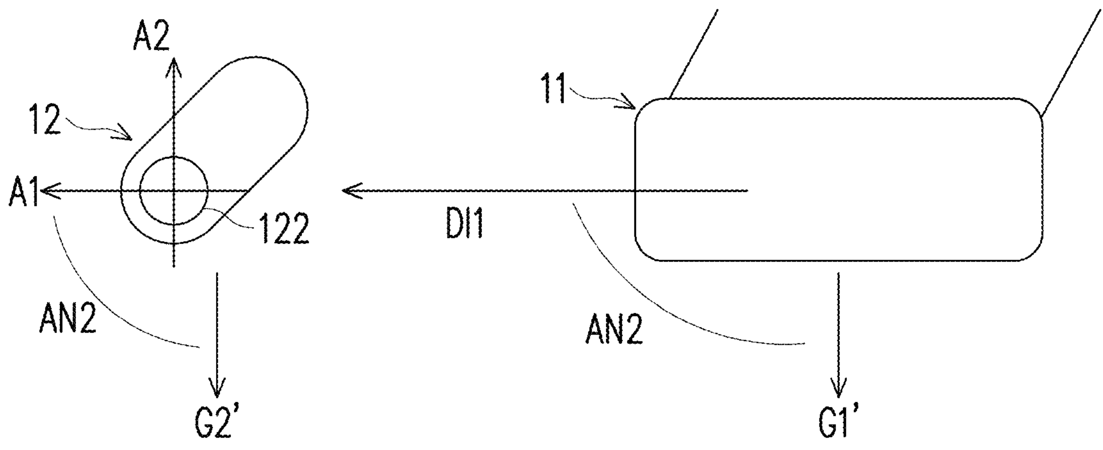

See FIG. 4A and FIG. 4B, which show further schematic diagrams of determining the first input axis associated with the input device based on the first reference direction according to FIG. 3.

In FIG. 4A, the peripheral device 12 or the host 11 obtains a first gravity direction G1 detected by the host 11, and obtains a second gravity direction G2 detected by the peripheral device 12. In the embodiment, the first gravity direction G1 and/or the second gravity direction G2 can be measured by, for example, the IMU on the corresponding device, but the disclosure is not limited thereto.

Next, the peripheral device 12 or the host 11 determines a first relative position between the first reference direction DI1 and the first gravity direction G1. For example, the first relative position may be characterized by an angle difference AN1 between the first reference direction DI1 and the first gravity direction G1 on a particular plane, but the disclosure is not limited thereto.

Afterwards, the peripheral device 12 or the host 11 determines the first input axis A1 based on the first relative position and the second gravity direction G2, wherein a second relative position between the positive direction of the first input axis A1 and the second gravity direction G2 corresponds to the first relative position between the first reference direction DI1 and the first gravity direction G1.

In the scenario of FIG. 4A, the second relative position between the positive direction of the first input axis A1 and the second gravity direction G2 can be characterized by the angle difference AN1 on the same particular plane, which corresponds to the first relative position, but the disclosure is not limited thereto.

Once the first input axis A1 is determined, the second input axis A2 can be accordingly determined, and the details thereof may be referred to the above discussions.

In one embodiment, in response to determining that the first relative position or the second gravity direction G2 has been changed, the peripheral device 12 or the host 11 may update the first input axis A1 based on the changed first relative position or the changed second gravity direction.

In FIG. 4B, it can be seen that the peripheral device 12 is rotated in comparison with the case in FIG. 4A, which may be understood that the user is wearing the peripheral device 12 in a different way (e.g., wearing the peripheral device 12 on different fingers/knuckles, etc.), such that the gravity direction detected by the peripheral device 12 has been changed to be the second gravity direction G2'. However, the mechanisms for determining the corresponding first input axis A1 and the second input axis A2 are the same.

For example, the peripheral device 12 or the host 11 obtains the first gravity direction G1' detected by the host 11, and obtains the second gravity direction G2' detected by the peripheral device 12.

Next, the peripheral device 12 or the host 11 determines a first relative position between the first reference direction DI1 and the first gravity direction G1'. For example, the first relative position may be characterized by an angle difference AN2 between the first reference direction DI1 and the first gravity direction G1' on a particular plane, but the disclosure is not limited thereto.

Afterwards, the peripheral device 12 or the host 11 determines the first input axis A1 based on the first relative position and the second gravity direction G2', wherein a second relative position between the positive direction of the first input axis A1 and the second gravity direction G2' corresponds to the first relative position between the first reference direction DI1 and the first gravity direction G1'.

Once the first input axis A1 is determined, the second input axis A2 can be accordingly determined, and the details thereof may be referred to the above discussions.

Referring back to FIG. 2, in step S230, in response to determining that a first input operation is detected by the input device 122, the peripheral device 12 or the host 11 transforms the first input operation into a first input event relative to the first input axis A1.

In one embodiment, the first input operation may be a first sliding operation sliding toward a first direction by a first distance. In this case, the peripheral device 12 or the host 11 may convert the first direction as a second direction with respect to the first input axis A1.

Taking FIG. 4A as an example, assuming that the first sliding operation performed by the user is a forward sliding operation on the OFN circuit. That is, to the user, the first direction is a forward direction with respect to the HMD. In this case, the peripheral device 12 or the host 11 may convert the first direction as a second direction with respect to the first input axis A1, wherein the second direction in FIG. 4A is the positive direction of the first input axis A1.

Taking FIG. 4B as an example, assuming that the first sliding operation performed by the user is still a forward sliding operation on the OFN circuit, which is rotated with respect to the OFN circuit in FIG. 4A. That is, to the user, the first direction is a forward direction with respect to the HMD. In this case, the peripheral device 12 or the host 11 may convert the first direction as a second direction with respect to the first input axis A1, wherein the second direction in FIG. 4A is still the positive direction of the first input axis A1, even though the OFN circuit has been rotated.

As can be seen from FIG. 4A and FIG. 4B, regardless of the position/rotation of the peripheral device 12, as long as the first direction of the first sliding operation (e.g., forward direction to the user) is the same relative to the host 11/user, the second direction obtained after conversion will be the same.

From another perspective, the user can use the same way to operate the peripheral device 12 in different positions/rotations to implement the same input operation, which improves the convenience for using the peripheral device 12.

After obtaining the second direction, the peripheral device 12 or the host 11 may map the first distance into a second distance with respect to the first input axis A1. In the embodiments where the input device 122 is the OFN circuit, the peripheral device 12 or the host 11 may map the first distance into the second distance which ranges between 0 and 1, but the disclosure is not limited thereto.

Next, the peripheral device 12 or the host 11 characterizes the first input event by using the second direction and the second distance.

For example, in the cases of FIG. 4A and FIG. 4B, the first input event may be understood as the sliding operation toward the positive direction of the first input axis A1 by the second distance (which may range between 0 and 1), but the disclosure is not limited thereto.

In step S240, the peripheral device 12 or the host 11 controls visual content displayed by the display 112 of the host 11 based on the first input event.

In one embodiment, the peripheral device 12 or the host 11 may scroll the visual content toward the second direction according to the second distance.

In the embodiments where the first input event is the sliding operation toward the positive direction of the first input axis A1 by the second distance, the peripheral device 12 or the host 11 may, for example, scroll the visual content upward, and the scrolling distance/speed may be positively related to the second distance. That is, the longer the second distance, the larger scrolling distance/speed is, but the disclosure is not limited thereto.

In another embodiment where the first input event is the sliding operation toward the negative direction of the first input axis A1 by the second distance, the peripheral device 12 or the host 11 may, for example, scroll the visual content downward, and the scrolling distance/speed may be also positively related to the second distance.

In the embodiment where the first input event is the sliding operation toward the positive direction of the second input axis A2 by the second distance, the peripheral device 12 or the host 11 may, for example, scroll the visual content rightward. On the other hand, in the embodiment where the first input event is the sliding operation toward the negative direction of the second input axis A2 by the second distance, the peripheral device 12 or the host 11 may, for example, scroll the visual content leftward.

In other embodiments of the disclosure, the first input axis A1 and/or the second input axis A2 can be calibrated by using a calibration process. In different embodiments, the calibration process may be manually activated by the user or automatically activated by the system 100.

Figure 5:
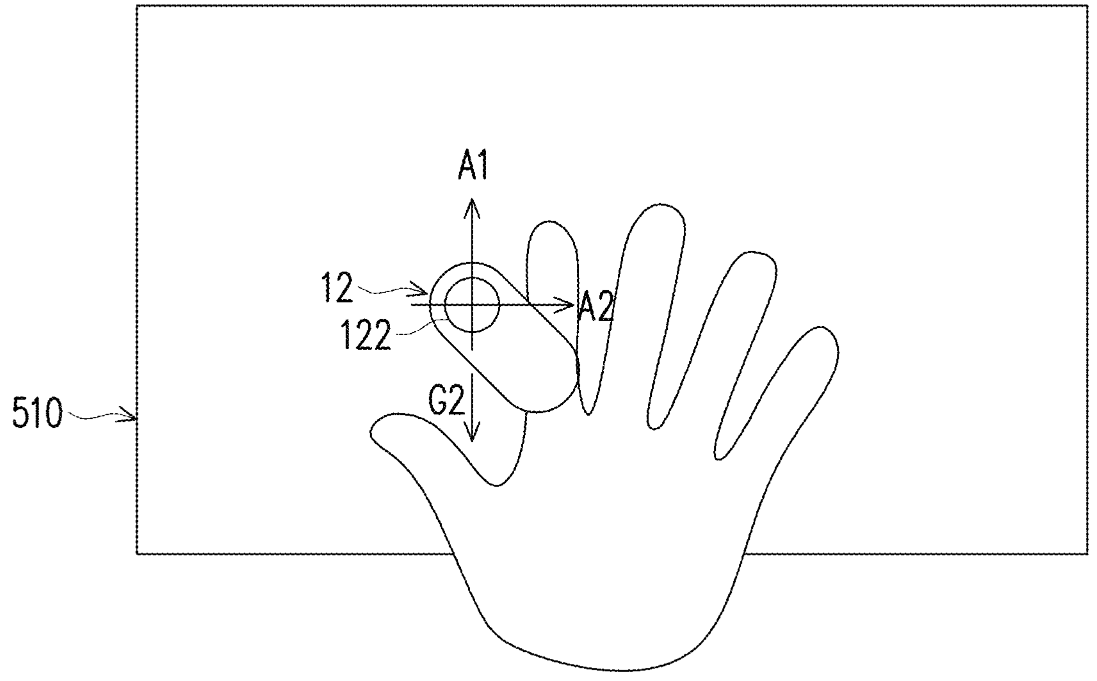
FIG. 5 shows a schematic diagram of the calibration process according to a second embodiment of the disclosure.

See FIG. 5, which shows a schematic diagram of the calibration process according to a second embodiment of the disclosure.

In the embodiment, in response to determining that the calibration process has been activated, the host 11 may guide the user to perform a calibration gesture in front of the host 12 while the user facing forward.

In one embodiment, the calibration gesture may be, for example, an open palm gesture. That is, the host 11 may guide, by audio and/or visual hint, the user to perform the open palm gesture in front of the host 12 while facing forward. Accordingly, the hand gesture may be within an image-capturing range of the front camera of the host 11, but the disclosure is not limited thereto.

In FIG. 5, the image-capturing range may corresponds to a field of view (FOV) 510 of the host 11, wherein the FOV 510 may refer to the observable area of the virtual environment that the user can see at any given moment. It is typically measured in degrees and represents the extent of the visual scene displayed to the user, but the disclosure is not limited thereto.

In the embodiment, the host 11 may show the scene captured by the front camera in the FOV 510, such that the user can observe the hand gesture in the FOV 510.

Next, the host 11 may use the front camera to capture an image of the hand gesture of the user, and the host 11 may determine whether the hand gesture of the user corresponds to the calibration gesture.

In FIG. 5, in response to determining that the calibration gesture has been detected in a calibration process, the peripheral device 12 or the host 11 may obtain the second gravity direction G2 detected by the peripheral device 12. Next, the peripheral device 12 or the host 11 may determine the first input axis A1 associated with the input device 122 based on the second gravity direction G2.

In one embodiment, the peripheral device 12 or the host 11 may determine an opposite direction of the second gravity direction G2 as the positive direction of the first input axis A1, but the disclosure is not limited thereto.

In one embodiment, the peripheral device 12 or the host 11 may determine the second input axis A2 associated with the input device 122 based on the first input axis A1, and the details thereof may be referred to the above embodiments.

Figure 6:
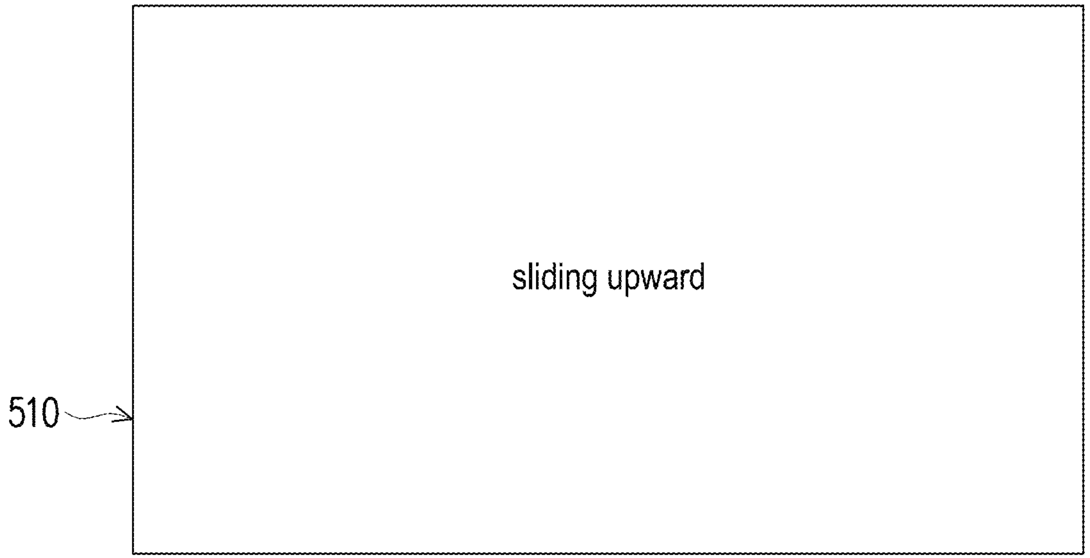
FIG. 6 shows a schematic diagram of the calibration process according to a third embodiment of the disclosure.
Figure 6:
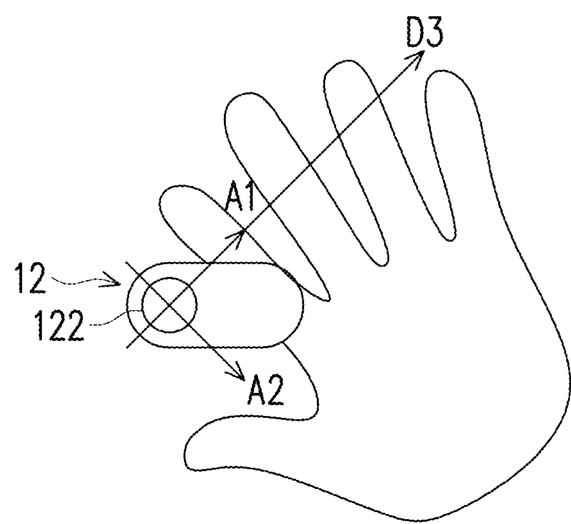

See FIG. 6, which shows a schematic diagram of the calibration process according to a third embodiment of the disclosure.

In the embodiment, in response to determining that the calibration process has been activated, the host 11 may guide the user to perform a target sliding operation on the input device 122 toward a designated direction corresponding to the first input axis A1.

In FIG. 6, the designated direction corresponding to the first input axis A1 may be, for example, upward direction. In the embodiment, the host 11 may guide, via audio and/or visual hint, the user to perform an upward sliding operation on the input device 122 as the target sliding operation.

In this case, the user may perform a sliding operation corresponding to the designated direction on the input device 122 based on his or her own understanding of the designated direction.

In the above example, the user may perform an upward sliding operation on the input device 122, and the associated upward direction is only the upward direction relative to the user, but the disclosure is not limited thereto.

Next, in response to determining that a second sliding operation toward a specific direction D3 corresponding to the designated direction has been detected by the input device 122, the peripheral device 12 or the host 11 may determine the first input axis A1 associated with the input device 122 based on the specific direction D3.

For example, the peripheral device 12 or the host 11 may determine the specific direction D3 as the positive direction of the first input axis A1, but the disclosure is not limited thereto.

After determining the first input axis A1, the second input axis A2 can be accordingly determined, and the details may be referred to the above embodiments.

The disclosure further provides a computer readable storage medium for executing the method for determining an input axis. The computer readable storage medium is composed of a plurality of program instructions (for example, a setting program instruction and a deployment program instruction) embodied therein. These program instructions can be loaded into the host 11 and executed by the same to execute the method for determining an input axis and the functions of the system 100 described above.

In summary, the embodiments of the disclosure provide a solution to dynamically determine the input axis of the input axis based on the first reference direction of the host. In this case, the user can use the same way to operate the peripheral device in different positions/rotations to implement the same input operation, which improves the convenience for using the peripheral device. In addition, by eliminating restrictions imposed by the way a user wears the peripheral device, such a solution could significantly enhance the overall user experience.

In addition, some other embodiments for determining the input axis are also proposed, which allow the user to flexibly calibrate the input axis of the input device.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for determining an input axis, comprising:

determining, by a peripheral device or a host, a first reference direction of the host, wherein the peripheral device has an input device, the peripheral device is connected with the host, and the host has a display;

determining, by the peripheral device or the host, a first input axis associated with the input device on the peripheral device based on the first reference direction;

obtaining, by the peripheral device or the host, a first gravity direction detected by the host, and obtaining a second gravity direction detected by the peripheral device;

determining, by the peripheral device or the host, a first relative position between the first reference direction and the first gravity direction;

in response to determining that the first relative position or the second gravity direction has been changed, updating, by the peripheral device or the host, the first input axis based on the changed first relative position or the changed second gravity direction;

in response to determining that a first input operation is detected by the input device, transforming, by the peripheral device or the host, the first input operation into a first input event relative to the first input axis; and controlling, by the peripheral device or the host, visual content displayed by the display of the host based on the first input event.

2. The method according to claim 1, wherein the first reference direction is a front direction where the host faces.

3. The method according to claim 1, wherein the first input axis is a vertical input axis associated with the input device.

4. The method according to claim 3, further comprising:

determining, by the peripheral device or the host, a second input axis associated with the input device based on the first input axis, wherein the second input axis is a horizontal input axis associated with the input device.

5. The method according to claim 1, wherein the first input operation is a first sliding operation sliding toward a first direction by a first distance, and transforming the first input operation into the first input event relative to the first input axis comprises:

converting the first direction as a second direction with respect to the first input axis;

mapping the first distance into a second distance with respect to the first input axis; and characterizing the first input event by using the second direction and the second distance.

6. The method according to claim 5, wherein controlling the visual content displayed by the display of the host based on the first input event comprises:

scrolling the visual content toward the second direction according to the second distance.

7. The method according to claim 1, further comprising:

determining, by the peripheral device or the host, the first input axis based on the first relative position and the second gravity direction, wherein a second relative position between a positive direction of the first input axis and the second gravity direction corresponds to the first relative position between the first reference direction and the first gravity direction.

8. The method according to claim 1, further comprising:

in response to determining that a calibration gesture has been detected in a calibration process, obtaining, by the peripheral device or the host, a second gravity direction detected by the peripheral device;

determining, by the peripheral device or the host, the first input axis associated with the input device based on the second gravity direction, wherein the first input axis is a vertical input axis associated with the input device; and determining, by the peripheral device or the host, a second input axis associated with the input device based on the first input axis, wherein the second input axis is a horizontal input axis associated with the input device.

9. The method according to claim 8, wherein determining the first input axis associated with the input device based on the second gravity direction comprises:

determining an opposite direction of the second gravity direction as a positive direction of the first input axis.

10. The method according to claim 8, wherein the host is a head-mounted display, the peripheral device is a wearable device worn on a hand of a user, and the method further comprises:

in response to determining that the calibration process has been activated, guiding, by the host, the user to perform the calibration gesture in front of the host while the user facing forward;

using, by the host, a front camera to capture an image of a hand gesture of the user;

determining, by the host, whether the hand gesture of the user corresponds to the calibration gesture.

11. The method according to claim 1, further comprising:

in response to determining that a calibration process has been activated, guiding, by the host, a user to perform a target sliding operation on the input device toward a designated direction corresponding to the first input axis;

in response to determining that a second sliding operation toward a specific direction corresponding to the designated direction has been detected by the input device, determining, by the peripheral device or the host, the first input axis associated with the input device based on the specific direction.

12. The method according to claim 11, wherein the designated direction corresponds to a positive direction of the first input axis, and determining the first input axis associated with the input device based on the specific direction comprises:

determining the specific direction as the positive direction of the first input axis.

13. A system for determining an input axis, comprising:

a host, having a display; and a peripheral device connected to the host, wherein:

the peripheral device or the host determines a first reference direction of the host, wherein the peripheral device has an input device, the peripheral device is connected with the host, and the host has a display;

the peripheral device or the host determines a first input axis associated with the input device on the peripheral device based on the first reference direction;

the peripheral device or the host obtains a first gravity direction detected by the host, and obtaining a second gravity direction detected by the peripheral device;

the peripheral device or the host determines a first relative position between the first reference direction and the first gravity direction;

in response to determining that the first relative position or the second gravity direction has been changed, the peripheral device or the host updates the first input axis based on the changed first relative position or the changed second gravity direction;

in response to determining that a first input operation is detected by the input device, the peripheral device or the host transforms the first input operation into a first input event relative to the first input axis; and the peripheral device or the host controls visual content displayed by the display of the host based on the first input event.

14. The system according to claim 13, wherein the first reference direction is a front direction where the host faces, and the first input axis is a vertical input axis associated with the input device.

15. The system according to claim 14, wherein the peripheral device or the host further determines a second input axis associated with the input device based on the first input axis, wherein the second input axis is a horizontal input axis associated with the input device.

16. The system according to claim 13, wherein the first input operation is a first sliding operation sliding toward a first direction by a first distance, and the peripheral device or the host performs:

converting the first direction as a second direction with respect to the first input axis;

mapping the first distance into a second distance with respect to the first input axis; and characterizing the first input event by using the second direction and the second distance.

17. The system according to claim 13, wherein the peripheral device or the host performs:

determining the first input axis based on the first relative position and the second gravity direction, wherein a second relative position between a positive direction of the first input axis corresponds to the first relative position between the first reference direction and the first gravity direction.

18. A non-transitory computer readable storage medium, the computer readable storage medium recording an executable computer program, the executable computer program being loaded by a peripheral device or a host to perform steps of:

determining a first reference direction of the host, wherein the peripheral device has an input device, the peripheral device is connected with the host, and the host has a display;

determining a first input axis associated with the input device on the peripheral device based on the first reference direction;

obtaining a first gravity direction detected by the host, and obtaining a second gravity direction detected by the peripheral device;

determining a first relative position between the first reference direction and the first gravity direction;

in response to determining that the first relative position or the second gravity direction has been changed, updating the first input axis based on the changed first relative position or the changed second gravity direction;

in response to determining that a first input operation is detected by the input device, transforming the first input operation into a first input event relative to the first input axis; and controlling visual content displayed by the display of the host based on the first input event.

* * * * *